(12) United States Patent
Hamza

(10) Patent No.: US 7,761,453 B2
(45) Date of Patent: Jul. 20, 2010

(54) METHOD AND SYSTEM FOR INDEXING AND SEARCHING AN IRIS IMAGE DATABASE

(75) Inventor: Rida M. Hamza, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 347 days.

(21) Appl. No.: 11/681,751

(22) Filed: Mar. 2, 2007

(65) Prior Publication Data
US 2007/0276853 A1 Nov. 29, 2007

Related U.S. Application Data

(63) Continuation-in-part of application No. 11/275,703, filed on Jan. 25, 2006, and a continuation-in-part of application No. 11/043,366, filed on Jan. 26, 2005, and a continuation-in-part of application No. 11/372,854, filed on Mar. 10, 2006, and a continuation-in-part of application No. 11/672,108, filed on Feb. 7, 2007, and a continuation-in-part of application No. 11/675,424, filed on Feb. 15, 2007, and a continuation-in-part of application No. 11/681,614, filed on Mar. 2, 2007, and a continuation-in-part of application No. 11/681,662, filed on Mar. 2, 2007.

(60) Provisional application No. 60/778,770, filed on Mar. 3, 2006, provisional application No. 60/647,270, filed on Jan. 26, 2005.

(51) Int. Cl.
*G06F 17/30* (2006.01)

(52) U.S. Cl. .............................. 707/737; 707/E17.039; 707/741

(58) Field of Classification Search .................... 707/2, 707/100–101, 736, 790, 791, 802, E17.039
See application file for complete search history.

(56) References Cited

U.S. PATENT DOCUMENTS 4,641,349 A 2/1987 Flom et al.

(Continued)

FOREIGN PATENT DOCUMENTS

EP 0878780 11/1998

(Continued)

OTHER PUBLICATIONS

White, "Fluid Mechanics, Fifth Edition," McGraw-Hill, Book, 866 pages, 2003.

(Continued)

*Primary Examiner*—Tim T. Vo
*Assistant Examiner*—Shiow-Jy Fan
(74) *Attorney, Agent, or Firm*—Crompton Seager & Tufte LLC

(57) ABSTRACT

A method and system for indexing and searching a database of iris images having a system to expedite a process of matching a subject to millions (more or less) of templates within a database is disclosed. The system may progressively match an iris image template to an iris template in a database by progressing from a top layer of the database to a lower layer of the database. Such matching or retrieval may use a subject code as a query or probe and then find a similarity measure for the features of codes or templates in the database. A multi-stage hierarchal clustering process may be used to compress codes and/or templates.

17 Claims, 7 Drawing Sheets

U.S. PATENT DOCUMENTS

| | | | |
|---|---|---|---|
| 5,291,560 | A | 3/1994 | Daugman |
| 5,293,427 | A | 3/1994 | Ueno et al. |
| 5,551,027 | A * | 8/1996 | Choy et al. ................. 395/600 |
| 5,572,596 | A | 11/1996 | Wildes et al. |
| 5,608,472 | A | 3/1997 | Szirth et al. |
| 5,717,512 | A | 2/1998 | Chmielewski, Jr. et al. |
| 5,751,836 | A | 5/1998 | Wildes et al. |
| 5,859,686 | A | 1/1999 | Aboutalib et al. |
| 5,901,238 | A | 5/1999 | Matsushita |
| 5,953,440 | A | 9/1999 | Zhang et al. |
| 5,956,122 | A | 9/1999 | Doster |
| 5,978,494 | A | 11/1999 | Zhang |
| 6,005,704 | A | 12/1999 | Chmielewski, Jr. et al. |
| 6,007,202 | A | 12/1999 | Apple et al. |
| 6,021,210 | A | 2/2000 | Camus et al. |
| 6,028,949 | A | 2/2000 | McKendall |
| 6,055,322 | A | 4/2000 | Salganicoff et al. |
| 6,064,752 | A | 5/2000 | Rozmus et al. |
| 6,069,967 | A | 5/2000 | Rozmus et al. |
| 6,081,607 | A | 6/2000 | Mori et al. |
| 6,088,470 | A | 7/2000 | Camus et al. |
| 6,091,899 | A | 7/2000 | Konishi et al. |
| 6,101,477 | A | 8/2000 | Hohle et al. |
| 6,104,431 | A | 8/2000 | Inoue et al. |
| 6,108,636 | A | 8/2000 | Yap et al. |
| 6,119,096 | A | 9/2000 | Mann et al. |
| 6,120,461 | A | 9/2000 | Smyth |
| 6,144,754 | A | 11/2000 | Okano et al. |
| 6,246,751 | B1 | 6/2001 | Bergl et al. |
| 6,247,813 | B1 | 6/2001 | Kim et al. |
| 6,252,977 | B1 | 6/2001 | Salganicoff et al. |
| 6,282,475 | B1 | 8/2001 | Washington |
| 6,285,505 | B1 | 9/2001 | Melville et al. |
| 6,285,780 | B1 | 9/2001 | Yamakita et al. |
| 6,289,113 | B1 | 9/2001 | McHugh et al. |
| 6,299,306 | B1 | 10/2001 | Braithwaite et al. |
| 6,308,015 | B1 | 10/2001 | Matsumoto |
| 6,309,069 | B1 | 10/2001 | Seal et al. |
| 6,320,610 | B1 | 11/2001 | Van Sant et al. |
| 6,320,973 | B2 | 11/2001 | Suzaki et al. |
| 6,323,761 | B1 | 11/2001 | Son |
| 6,325,765 | B1 | 12/2001 | Hay et al. |
| 6,330,674 | B1 | 12/2001 | Angelo et al. |
| 6,332,193 | B1 | 12/2001 | Glass et al. |
| 6,344,683 | B1 | 2/2002 | Kim |
| 6,370,260 | B1 | 4/2002 | Pavlidis et al. |
| 6,377,699 | B1 | 4/2002 | Musgrave et al. |
| 6,400,835 | B1 | 6/2002 | Lemelson et al. |
| 6,424,727 | B1 | 7/2002 | Musgrave et al. |
| 6,424,845 | B1 | 7/2002 | Emmoft et al. |
| 6,433,818 | B1 | 8/2002 | Steinberg et al. |
| 6,438,752 | B1 | 8/2002 | McClard |
| 6,441,482 | B1 | 8/2002 | Foster |
| 6,446,045 | B1 | 9/2002 | Stone et al. |
| 6,483,930 | B1 | 11/2002 | Musgrave et al. |
| 6,484,936 | B1 | 11/2002 | Nicoll et al. |
| 6,490,443 | B1 | 12/2002 | Freeny, Jr. |
| 6,493,363 | B1 | 12/2002 | Roger et al. |
| 6,493,669 | B1 | 12/2002 | Curry et al. |
| 6,494,363 | B1 | 12/2002 | Roger et al. |
| 6,503,163 | B1 | 1/2003 | Van Sant et al. |
| 6,505,193 | B1 | 1/2003 | Musgrave et al. |
| 6,516,078 | B1 | 2/2003 | Yang et al. |
| 6,516,087 | B1 | 2/2003 | Camus |
| 6,516,416 | B2 | 2/2003 | Gregg et al. |
| 6,522,772 | B1 | 2/2003 | Morrison et al. |
| 6,526,160 | B1 | 2/2003 | Ito |
| 6,532,298 | B1 | 3/2003 | Cambier et al. |
| 6,540,392 | B1 | 4/2003 | Braithwaite |
| 6,542,624 | B1 | 4/2003 | Oda |
| 6,546,121 | B1 | 4/2003 | Oda |
| 6,553,494 | B1 | 4/2003 | Glass |
| 6,580,356 | B1 | 6/2003 | Alt et al. |
| 6,591,001 | B1 | 7/2003 | Oda et al. |
| 6,591,064 | B2 | 7/2003 | Higashiyama et al. |
| 6,594,377 | B1 | 7/2003 | Kim et al. |
| 6,594,399 | B1 | 7/2003 | Camus et al. |
| 6,598,971 | B2 | 7/2003 | Cleveland |
| 6,614,919 | B1 | 9/2003 | Suzaki et al. |
| 6,652,099 | B2 | 11/2003 | Chae et al. |
| 6,674,367 | B2 | 1/2004 | Sweatte |
| 6,690,997 | B2 | 2/2004 | Rivalto |
| 6,708,176 | B2 | 3/2004 | Strunk et al. |
| 6,711,562 | B1 * | 3/2004 | Ross et al. ..................... 707/3 |
| 6,714,665 | B1 | 3/2004 | Hanna et al. |
| 6,718,049 | B2 | 4/2004 | Pavlidis et al. |
| 6,732,278 | B2 | 5/2004 | Baird, III et al. |
| 6,734,783 | B1 | 5/2004 | Anbai |
| 6,745,520 | B2 | 6/2004 | Puskaric et al. |
| 6,751,733 | B1 | 6/2004 | Nakamura et al. |
| 6,753,919 | B1 | 6/2004 | Daugman |
| 6,754,640 | B2 | 6/2004 | Bozeman |
| 6,760,467 | B1 | 7/2004 | Min et al. |
| 6,765,470 | B2 | 7/2004 | Shinzaki |
| 6,766,041 | B2 | 7/2004 | Golden et al. |
| 6,775,774 | B1 | 8/2004 | Harper |
| 6,785,406 | B1 | 8/2004 | Kamada |
| 6,793,134 | B2 | 9/2004 | Clark |
| 6,819,219 | B1 | 11/2004 | Bolle et al. |
| 6,829,370 | B1 | 12/2004 | Pavlidis et al. |
| 6,832,044 | B2 | 12/2004 | Doi et al. |
| 6,836,554 | B1 | 12/2004 | Bolle et al. |
| 6,837,436 | B2 | 1/2005 | Swartz et al. |
| 6,845,479 | B2 | 1/2005 | Park |
| 6,853,444 | B2 | 2/2005 | Haddad |
| 6,867,683 | B2 | 3/2005 | Calvesio et al. |
| 6,873,960 | B1 | 3/2005 | Wood et al. |
| 6,896,187 | B2 | 5/2005 | Stockhammer |
| 6,905,411 | B2 | 6/2005 | Nguyen et al. |
| 6,920,237 | B2 | 7/2005 | Chen et al. |
| 6,930,707 | B2 | 8/2005 | Bates et al. |
| 6,934,849 | B2 | 8/2005 | Kramer et al. |
| 6,954,738 | B2 | 10/2005 | Wang et al. |
| 6,957,341 | B2 | 10/2005 | Rice et al. |
| 6,972,797 | B2 | 12/2005 | Izumi |
| 7,053,948 | B2 | 5/2006 | Konishi |
| 7,184,577 | B2 | 2/2007 | Chen et al. |
| 2001/0026632 | A1 | 10/2001 | Tamai |
| 2001/0027116 | A1 | 10/2001 | Baird |
| 2001/0047479 | A1 | 11/2001 | Bromba et al. |
| 2001/0051924 | A1 | 12/2001 | Uberti |
| 2001/0054154 | A1 | 12/2001 | Tam |
| 2002/0010857 | A1 | 1/2002 | Karthik |
| 2002/0033896 | A1 | 3/2002 | Hatano |
| 2002/0039433 | A1 | 4/2002 | Shin |
| 2002/0040434 | A1 | 4/2002 | Elliston et al. |
| 2002/0062280 | A1 | 5/2002 | Zachariassen et al. |
| 2002/0077841 | A1 | 6/2002 | Thompson |
| 2002/0089157 | A1 | 7/2002 | Breed et al. |
| 2002/0106113 | A1 | 8/2002 | Park |
| 2002/0112177 | A1 | 8/2002 | Voltmer et al. |
| 2002/0114495 | A1 | 8/2002 | Chen et al. |
| 2002/0130961 | A1 | 9/2002 | Lee et al. |
| 2002/0131622 | A1 | 9/2002 | Lee et al. |
| 2002/0139842 | A1 | 10/2002 | Swaine |
| 2002/0140715 | A1 | 10/2002 | Smet |
| 2002/0142844 | A1 | 10/2002 | Kerr |
| 2002/0144128 | A1 | 10/2002 | Rahman et al. |
| 2002/0150281 | A1 | 10/2002 | Cho |
| 2002/0154794 | A1 | 10/2002 | Cho |
| 2002/0158750 | A1 | 10/2002 | Almalik |
| 2002/0164054 | A1 | 11/2002 | McCartney et al. |
| 2002/0175182 | A1 | 11/2002 | Matthews |
| 2002/0186131 | A1 | 12/2002 | Fettis |

| | | | | | | |
|---|---|---|---|---|---|---|
| 2002/0191075 A1 | 12/2002 | Doi et al. | | 2003/0200180 A1 | 10/2003 | Phelan, III et al. |
| 2002/0191076 A1 | 12/2002 | Wada et al. | | 2003/0210139 A1 | 11/2003 | Brooks et al. |
| 2002/0194128 A1 | 12/2002 | Maritzen et al. | | 2003/0210802 A1 | 11/2003 | Schuessier |
| 2002/0194131 A1 | 12/2002 | Dick | | 2003/0218719 A1 | 11/2003 | Abourizk et al. |
| 2002/0198731 A1 | 12/2002 | Barnes et al. | | 2003/0225711 A1 | 12/2003 | Paping |
| 2003/0002714 A1 | 1/2003 | Wakiyama | | 2003/0228898 A1 | 12/2003 | Rowe |
| 2003/0012413 A1 | 1/2003 | Kusakari et al. | | 2003/0233556 A1 | 12/2003 | Angelo et al. |
| 2003/0014372 A1 | 1/2003 | Wheeler et al. | | 2003/0235326 A1 | 12/2003 | Morikawa et al. |
| 2003/0020828 A1 | 1/2003 | Ooi et al. | | 2003/0235411 A1 | 12/2003 | Morikawa et al. |
| 2003/0038173 A1 | 2/2003 | Blackson et al. | | 2003/0236120 A1 | 12/2003 | Reece et al. |
| 2003/0046228 A1 | 3/2003 | Berney | | 2004/0001614 A1 | 1/2004 | Russon et al. |
| 2003/0053663 A1 | 3/2003 | Chen et al. | | 2004/0002894 A1 | 1/2004 | Kocher |
| 2003/0055689 A1 | 3/2003 | Block et al. | | 2004/0005078 A1 | 1/2004 | Tillotson |
| 2003/0055787 A1 | 3/2003 | Fujii | | 2004/0006553 A1 | 1/2004 | de Vries et al. |
| 2003/0058492 A1 | 3/2003 | Wakiyama | | 2004/0010462 A1 | 1/2004 | Moon et al. |
| 2003/0061172 A1 | 3/2003 | Robinson | | 2004/0012760 A1 | 1/2004 | Mihashi et al. |
| 2003/0061233 A1 | 3/2003 | Manasse et al. | | 2004/0019570 A1 | 1/2004 | Bolle et al. |
| 2003/0065626 A1 | 4/2003 | Allen | | 2004/0023664 A1 | 2/2004 | Mirouze et al. |
| 2003/0071743 A1 | 4/2003 | Seah et al. | | 2004/0023709 A1 | 2/2004 | Beaulieu et al. |
| 2003/0072475 A1 | 4/2003 | Tamori | | 2004/0025030 A1 | 2/2004 | Corbett-Clark et al. |
| 2003/0073499 A1 | 4/2003 | Reece | | 2004/0025031 A1 | 2/2004 | Ooi et al. |
| 2003/0074317 A1 | 4/2003 | Hofi | | 2004/0025053 A1 | 2/2004 | Hayward |
| 2003/0074326 A1 | 4/2003 | Byers | | 2004/0029564 A1 | 2/2004 | Hodge |
| 2003/0076161 A1 | 4/2003 | Tisse | | 2004/0030930 A1 | 2/2004 | Nomura |
| 2003/0076300 A1 | 4/2003 | Lauper et al. | | 2004/0035123 A1 | 2/2004 | Kim et al. |
| 2003/0076984 A1 | 4/2003 | Tisse et al. | | 2004/0037450 A1 | 2/2004 | Bradski |
| 2003/0080194 A1 | 5/2003 | O'Hara et al. | | 2004/0039914 A1 | 2/2004 | Barr et al. |
| 2003/0091215 A1 | 5/2003 | Lauper et al. | | 2004/0042641 A1 | 3/2004 | Jakubowski |
| 2003/0092489 A1 | 5/2003 | Veradej | | 2004/0044627 A1 | 3/2004 | Russell et al. |
| 2003/0095689 A1 | 5/2003 | Volkommer et al. | | 2004/0046640 A1 | 3/2004 | Jourdain et al. |
| 2003/0098776 A1 | 5/2003 | Friedli | | 2004/0049687 A1 | 3/2004 | Orsini et al. |
| 2003/0099379 A1 | 5/2003 | Monk et al. | | 2004/0050924 A1 | 3/2004 | Mletzko et al. |
| 2003/0099381 A1 | 5/2003 | Ohba | | 2004/0050930 A1 | 3/2004 | Rowe |
| 2003/0103652 A1 | 6/2003 | Lee et al. | | 2004/0052405 A1 | 3/2004 | Walfridsson |
| 2003/0107097 A1 | 6/2003 | McArthur et al. | | 2004/0052418 A1 | 3/2004 | DeLean |
| 2003/0107645 A1 | 6/2003 | Yoon | | 2004/0059590 A1 | 3/2004 | Mercredi et al. |
| 2003/0108224 A1 | 6/2003 | Ike | | 2004/0059953 A1 | 3/2004 | Purnell |
| 2003/0108225 A1 | 6/2003 | Li | | 2004/0104266 A1 | 6/2004 | Bolle et al. |
| 2003/0115148 A1 | 6/2003 | Takhar | | 2004/0117636 A1 | 6/2004 | Cheng |
| 2003/0115459 A1 | 6/2003 | Monk | | 2004/0133804 A1 | 7/2004 | Smith et al. |
| 2003/0116630 A1 | 6/2003 | Carey et al. | | 2004/0146187 A1 | 7/2004 | Jeng |
| 2003/0118212 A1 | 6/2003 | Min et al. | | 2004/0148526 A1 | 7/2004 | Sands et al. |
| 2003/0118217 A1 | 6/2003 | Kondo et al. | | 2004/0160518 A1 | 8/2004 | Park |
| 2003/0123711 A1 | 7/2003 | Kim et al. | | 2004/0162870 A1 | 8/2004 | Matsuzaki et al. |
| 2003/0125054 A1 | 7/2003 | Garcia | | 2004/0162984 A1 | 8/2004 | Freeman et al. |
| 2003/0125057 A1 | 7/2003 | Pesola | | 2004/0169817 A1 | 9/2004 | Grotehusmann et al. |
| 2003/0126560 A1 | 7/2003 | Kurapati et al. | | 2004/0172541 A1 | 9/2004 | Ando et al. |
| 2003/0131245 A1 | 7/2003 | Linderman | | 2004/0174070 A1 | 9/2004 | Voda et al. |
| 2003/0131265 A1 | 7/2003 | Bhakta | | 2004/0179720 A1 | 9/2004 | Chen et al. |
| 2003/0133597 A1 | 7/2003 | Moore et al. | | 2004/0190759 A1 | 9/2004 | Caldwell |
| 2003/0140235 A1 | 7/2003 | Immega et al. | | 2004/0193893 A1 | 9/2004 | Braithwaite et al. |
| 2003/0140928 A1 | 7/2003 | Bui et al. | | 2004/0219902 A1 | 11/2004 | Lee et al. |
| 2003/0141411 A1 | 7/2003 | Pandya et al. | | 2004/0233038 A1 | 11/2004 | Beenau et al. |
| 2003/0149881 A1 | 8/2003 | Patel et al. | | 2004/0240711 A1 | 12/2004 | Hamza et al. |
| 2003/0152251 A1 | 8/2003 | Ike | | 2004/0252866 A1 | 12/2004 | Tisse et al. |
| 2003/0152252 A1 | 8/2003 | Kondo et al. | | 2004/0255168 A1 | 12/2004 | Murashita et al. |
| 2003/0156741 A1 | 8/2003 | Lee et al. | | 2005/0008200 A1 | 1/2005 | Azuma et al. |
| 2003/0158762 A1 | 8/2003 | Wu | | 2005/0008201 A1 | 1/2005 | Lee et al. |
| 2003/0158821 A1 | 8/2003 | Maia | | 2005/0029353 A1 | 2/2005 | Isemura et al. |
| 2003/0159051 A1 | 8/2003 | Hollnagel | | 2005/0052566 A1 | 3/2005 | Kato |
| 2003/0163739 A1 | 8/2003 | Armington et al. | | 2005/0055582 A1 | 3/2005 | Bazakos et al. |
| 2003/0169334 A1 | 9/2003 | Braithwaite et al. | | 2005/0063567 A1 | 3/2005 | Saitoh et al. |
| 2003/0169901 A1 | 9/2003 | Pavlidis et al. | | 2005/0084137 A1 | 4/2005 | Kim et al. |
| 2003/0169907 A1 | 9/2003 | Edwards et al. | | 2005/0084179 A1 | 4/2005 | Hanna et al. |
| 2003/0173408 A1 | 9/2003 | Mosher, Jr. et al. | | 2005/0099288 A1 | 5/2005 | Spitz et al. |
| 2003/0174049 A1 | 9/2003 | Beigel et al. | | 2005/0102502 A1 | 5/2005 | Sagen |
| 2003/0177051 A1 | 9/2003 | Driscoll et al. | | 2005/0110610 A1 | 5/2005 | Bazakos et al. |
| 2003/0182151 A1 | 9/2003 | Taslitz | | 2005/0125258 A1 | 6/2005 | Yellin et al. |
| 2003/0182182 A1 | 9/2003 | Kocher | | 2005/0127161 A1 | 6/2005 | Smith et al. |
| 2003/0191949 A1 | 10/2003 | Odagawa | | 2005/0129286 A1 | 6/2005 | Hekimian |
| 2003/0194112 A1 | 10/2003 | Lee | | 2005/0134796 A1 | 6/2005 | Zelvin et al. |
| 2003/0195935 A1 | 10/2003 | Leeper | | 2005/0138385 A1 | 6/2005 | Friedli et al. |
| 2003/0198368 A1 | 10/2003 | Kee | | 2005/0138387 A1 | 6/2005 | Lam et al. |

| | | | | | | |
|---|---|---|---|---|---|---|
| 2005/0146640 A1 | 7/2005 | Shibata | | JP | 2000237167 | 9/2000 |
| 2005/0151620 A1 | 7/2005 | Neumann | | JP | 2000242788 | 9/2000 |
| 2005/0152583 A1 | 7/2005 | Kondo et al. | | JP | 2000259817 | 9/2000 |
| 2005/0193212 A1 | 9/2005 | Yuhara | | JP | 2000356059 | 12/2000 |
| 2005/0199708 A1 | 9/2005 | Friedman | | JP | 2000357232 | 12/2000 |
| 2005/0206501 A1 | 9/2005 | Farhat | | JP | 2001005948 | 1/2001 |
| 2005/0206502 A1 | 9/2005 | Bernitz | | JP | 2001067399 | 3/2001 |
| 2005/0207614 A1 | 9/2005 | Schonberg et al. | | JP | 2001101429 | 4/2001 |
| 2005/0210267 A1 | 9/2005 | Sugano et al. | | JP | 2001167275 | 6/2001 |
| 2005/0210270 A1 | 9/2005 | Rohatgi et al. | | JP | 2001222661 | 8/2001 |
| 2005/0210271 A1 | 9/2005 | Chou et al. | | JP | 2001292981 | 10/2001 |
| 2005/0238214 A1 | 10/2005 | Matsuda et al. | | JP | 2001297177 | 10/2001 |
| 2005/0240778 A1 | 10/2005 | Saito | | JP | 2001358987 | 12/2001 |
| 2005/0248725 A1 | 11/2005 | Ikoma et al. | | JP | 2002119477 | 4/2002 |
| 2005/0249385 A1 | 11/2005 | Kondo et al. | | JP | 2002133415 | 5/2002 |
| 2005/0255840 A1 | 11/2005 | Markham | | JP | 2002153444 | 5/2002 |
| 2006/0165266 A1 | 7/2006 | Hamza | | JP | 2002153445 | 5/2002 |
| 2006/0274919 A1 | 12/2006 | LoIacono et al. | | JP | 2002260071 | 9/2002 |
| 2007/0036397 A1 | 2/2007 | Hamza | | JP | 2002271689 | 9/2002 |
| 2007/0047772 A1 * | 3/2007 | Matey et al. ........ 382/117 | | JP | 2002286650 | 10/2002 |
| | | | | JP | 2002312772 | 10/2002 |
| FOREIGN PATENT DOCUMENTS | | | | JP | 2002329204 | 11/2002 |
| | | | | JP | 2003006628 | 1/2003 |
| EP | 0910986 | 4/1999 | | JP | 2003036434 | 2/2003 |
| EP | 0962894 | 12/1999 | | JP | 2003108720 | 4/2003 |
| EP | 1018297 | 7/2000 | | JP | 2003108983 | 4/2003 |
| EP | 1024463 | 8/2000 | | JP | 2003132355 | 5/2003 |
| EP | 1028398 | 8/2000 | | JP | 2003150942 | 5/2003 |
| EP | 1041506 | 10/2000 | | JP | 2003153880 | 5/2003 |
| EP | 1041523 | 10/2000 | | JP | 2003242125 | 8/2003 |
| EP | 1126403 | 8/2001 | | JP | 2003271565 | 9/2003 |
| EP | 1477925 | 11/2004 | | JP | 2003271940 | 9/2003 |
| GB | 2369205 | 5/2002 | | JP | 2003308522 | 10/2003 |
| GB | 2371396 | 7/2002 | | JP | 2003308523 | 10/2003 |
| GB | 2375913 | 11/2002 | | JP | 2003317102 | 11/2003 |
| GB | 2402840 | 12/2004 | | JP | 2003331265 | 11/2003 |
| GB | 2411980 | 9/2005 | | JP | 2004005167 | 1/2004 |
| JP | 9161135 | 6/1997 | | JP | 2004021406 | 1/2004 |
| JP | 9198545 | 7/1997 | | JP | 2004030334 | 1/2004 |
| JP | 9201348 | 8/1997 | | JP | 2004038305 | 2/2004 |
| JP | 9147233 | 9/1997 | | JP | 2004094575 | 3/2004 |
| JP | 9234264 | 9/1997 | | JP | 2004152046 | 5/2004 |
| JP | 9305765 | 11/1997 | | JP | 2004163356 | 6/2004 |
| JP | 9319927 | 12/1997 | | JP | 2004164483 | 6/2004 |
| JP | 10021392 | 1/1998 | | JP | 2004171350 | 6/2004 |
| JP | 10040386 | 2/1998 | | JP | 2004171602 | 6/2004 |
| JP | 10049728 | 2/1998 | | JP | 2004206444 | 7/2004 |
| JP | 10137219 | 5/1998 | | JP | 2004220376 | 8/2004 |
| JP | 10137221 | 5/1998 | | JP | 2004261515 | 9/2004 |
| JP | 10137222 | 5/1998 | | JP | 2004280221 | 10/2004 |
| JP | 10137223 | 5/1998 | | JP | 2004280547 | 10/2004 |
| JP | 10248827 | 9/1998 | | JP | 2004287621 | 10/2004 |
| JP | 10269183 | 10/1998 | | JP | 2004315127 | 11/2004 |
| JP | 11047117 | 2/1999 | | JP | 2004318248 | 11/2004 |
| JP | 11089820 | 4/1999 | | JP | 2005004524 | 1/2005 |
| JP | 11200684 | 7/1999 | | JP | 2005011207 | 1/2005 |
| JP | 11203478 | 7/1999 | | JP | 2005025577 | 1/2005 |
| JP | 11213047 | 8/1999 | | JP | 2005038257 | 2/2005 |
| JP | 11339037 | 12/1999 | | JP | 2005062990 | 3/2005 |
| JP | 2000005149 | 1/2000 | | JP | 2005115961 | 4/2005 |
| JP | 2000005150 | 1/2000 | | JP | 2005148883 | 6/2005 |
| JP | 2000011163 | 1/2000 | | WO | WO 97/17674 | 5/1997 |
| JP | 2000023946 | 1/2000 | | WO | WO 98/02083 | 1/1998 |
| JP | 2000083930 | 3/2000 | | WO | WO 98/08439 | 3/1998 |
| JP | 2000102510 | 4/2000 | | WO | WO 99/32317 | 7/1999 |
| JP | 2000102524 | 4/2000 | | WO | WO 99/52422 | 10/1999 |
| JP | 2000105830 | 4/2000 | | WO | WO 99/65175 | 12/1999 |
| JP | 2000107156 | 4/2000 | | WO | WO 00/28484 | 5/2000 |
| JP | 2000139878 | 5/2000 | | WO | WO 00/29986 | 5/2000 |
| JP | 2000155863 | 6/2000 | | WO | WO 00/31677 | 6/2000 |
| JP | 2000182050 | 6/2000 | | WO | WO 00/36605 | 6/2000 |
| JP | 2000185031 | 7/2000 | | WO | WO 01/01329 | 1/2001 |
| JP | 2000194972 | 7/2000 | | WO | WO 01/03100 | 1/2001 |

| | | |
|---|---|---|
| WO | WO 01/28476 | 4/2001 |
| WO | WO 01/35348 | 5/2001 |
| WO | WO 01/35349 | 5/2001 |
| WO | 0140982 | 6/2001 |
| WO | WO 01/63994 | 8/2001 |
| WO | WO 01/69490 | 9/2001 |
| WO | WO 01/86599 | 11/2001 |
| WO | WO 02/01451 | 1/2002 |
| WO | WO 02/19030 | 3/2002 |
| WO | WO 02/35452 | 5/2002 |
| WO | WO 02/35480 | 5/2002 |
| WO | WO 02/091735 | 11/2002 |
| WO | WO 02/095657 | 11/2002 |
| WO | WO 03/002387 | 1/2003 |
| WO | WO 03/054777 | 7/2003 |
| WO | WO 03/077077 | 9/2003 |
| WO | WO 2004/029863 | 4/2004 |
| WO | WO 2004/042646 | 5/2004 |
| WO | WO 2004/055737 | 7/2004 |
| WO | WO 2004/089214 | 10/2004 |
| WO | WO 2004/097743 | 11/2004 |
| WO | WO 2005/008567 | 1/2005 |
| WO | WO 2005/013181 | 2/2005 |
| WO | WO 2005/024698 | 3/2005 |
| WO | WO 2005/024708 | 3/2005 |
| WO | WO 2005/024709 | 3/2005 |
| WO | WO 2005/029388 | 3/2005 |
| WO | WO 2005/062235 | 7/2005 |
| WO | WO 2005/069252 | 7/2005 |
| WO | WO 2005/093681 | 10/2005 |
| WO | WO 2005/096962 | 10/2005 |
| WO | WO 2005/098531 | 10/2005 |
| WO | WO 2005/104704 | 11/2005 |
| WO | WO 2005/109344 | 11/2005 |
| WO | WO 2006/023046 | 3/2006 |
| WO | WO 2006/063076 | 6/2006 |

OTHER PUBLICATIONS

Ratha et al., "A Real-Time Matching System for Large Fingerprint Databases," IEEE Transactions On Pattern Analysis and Machine Intelligence, vol. 16, No. 8, pp. 799-812. Aug. 1996.

Bonney et al., "Iris Pattern Extraction Using Bit Planes and Standard Deviations," IEEE, pp. 582-586, 2004.

Camus et al., "Reliable and Fast Eye Finding in Close-up Images," IEEE, pp. 389-394, 2002.

Cui et al., "A Fast and Robust Iris Localization Method Based on Texture Segmentation," 8 pages, 2004.

Cui et al., "An Appearance-Based Method for Iris Detection," 6 pages, 2004.

Cui et al., "An Iris Detection Method Based on Structure Information," Advances in Biometric Person Authentication, International Workshop on Biometric Recognition Systems, IWBRS 2005, Beijing China, 10 pages, Oct. 22-23, 2005.

Cui et al., "An Iris Image Synthesis Method Based on PCA and Super-Resolution," IEEE Computer Society, Proceedings of the 17th International Conference on Pattern Recognition, 6 pages, Aug. 23-26, 2004.

Cui et al., "An Iris Recognition Algorithm Using Local Extreme Points," Biometric Authentication, First International Conference, ICBA 2004, Hong Kong, China, 10 pages, Jul. 15-17, 2004.

Daugman, "Results From 200 Billion Iris Cross-Comparisons," University of Cambridge Computer Laboratory, Technical Report, No. 635, 8 pages, Jun. 2005.

Du et al., "A One-Dimensional Approach for Iris Identification," 11 pages, prior to Jan. 25, 2006.

http://www.newscientisttech.com/article/dn11110-invention-covert-iris-sc, "Invention: Covert Iris Scanner," 3 pages, printed February 8, 2007.

Huang et al., "Iris Model Based On Local Orientation Description," 5 pages, prior to Jan. 25, 2006.

Huang et al., "An Efficient Iris Recognition System," IEEE Proceedings of the First International Conference on Machine Learning and Cybernetics, Beijing, pp. 450-454, Nov. 4-5, 2002.

Ma et al., "Personal Identification Based on Iris Texture Analysis," IEEE Transactions on Pattern Analysis and Machine Intelligence, vol. 25, No. 12, pp. 1519-1533, Dec. 2003.

Masek, "Recognition of Human Iris Patterns for Biometric Identification," 61 pages, 2003.

Sun et al., "Robust Encoding of Local Ordinal Measures: A General Framework of Iris Recognition," 13 pages, prior to Jan. 25, 2006.

Avcibas et al., "Steganalysis Using Image Quality Metrics," IEEE Transactions on Image Processing, vol. 12, No. 2, pp. 221-229, Feb. 2003.

Boles, "A Security System Based on Human Iris Identification Using Wavelet Transform," IEEE First International Conference on Knowledge-Based Intelligent Electronic Systems, May 21-23, Adelaide, Australia, pp. 533-541, 1997.

Carson et al., "Blobworld: Image Segmentation Using Expectation-Maximization and Its Application to Image Querying," IEEE Transactions on Pattern Analysis and Machine Intelligence, vol. 24, No. 8, pp. 1026-1038, Aug. 2002.

Daugman, "How Iris Recognition Works," IEEE 2002 International Conference on Image Processing, vol. I of III, 6 pages, Sep. 22-25, 2002.

Guo et al., "A System for Automatic Iris Capturing," Mitsubishi Electric Research Laboratories, Inc., 10 pages, 2005.

Guo, "Face, Expression, and Iris Recognition Using Learning-Based Approaches," 132 pages, 2006.

Jalaja et al., "Texture Element Feature Characterizations for CBIR," IEEE, pp. 733-736, 2005.

Kalka et al., "Image Quality Assessment for Iris Biometric," Proc. Of SPIE vol. 6202 62020D, 11 pages, 2006.

Ko et al., "Monitoring and Reporting of Fingerprint Image Quality and Match Accuracy for a Large User Application," IEEE Computer Society, Proceedings of the 33$^{rd}$ Applied Imagery Pattern Recognition Workshop, 6 pages, 2004.

Lau et al., "Finding a Small Number of Regions in an Image Using Low-Level Features," Pattern Recognition 35, pp. 2323-2339, 2002.

Maurer et al., "Tracking and Learning Graphs and Pose on Image Sequences of Faces," IEEE Computer Society Press, International Conference on Automatic Face and Gesture Recognition, pp. 176-181, Oct. 14-16, 1996.

Oppenheim et al, "The Importance of Phase in Signals," Proceedings of the IEEE, vol. 69, No. 5, pp. 529-541, 1981.

Sony, "Network Color Camera, SNC-RZ30N (NTSC)," 6 pages, Aug. 2002.

Wang et al, "Image Quality Assessment: From Error Visibility to Structural Similarity," IEEE Transactions on Image Processing, vol. 13, No. 4, pp. 600-612, Apr. 2004.

Wang et al., "A Universal Image Quality Index," IEEE Signal Processing Letters, vol. 9, No. 3, pp. 81-84, Mar. 2002.

Wang et al., "Local Phase Coherence and the Perception of Blur," Advances in Nueral Information Processing Systems 16, pp. 1435-1442, 2004.

* cited by examiner

METHOD AND SYSTEM FOR INDEXING AND SEARCHING AN IRIS IMAGE DATABASE

This application claims the benefit of U.S. Provisional Application No. 60/778,770, filed Mar. 3, 2006.

This application is a continuation-in-part of U.S. patent application Ser. No. 11/275,703, filed Jan. 25, 2006, which claims the benefit of U.S. Provisional Application No. 60/647,270, filed Jan. 26, 2005.

This application is a continuation-in-part of U.S. patent application Ser. No. 11/043,366, filed Jan. 26, 2005.

This application is a continuation-in-part of U.S. patent application Ser. No. 11/372,854, filed Mar. 10, 2006;

This application is a continuation-in-part of U.S. patent application Ser. No. 11/672,108, filed Feb. 7, 2007.

This application is a continuation-in-part of U.S. patent application Ser. No. 11/675,424, filed Feb. 15, 2007.

This application is a continuation-in-part of U.S. patent application Ser. No. 11/681,614, filed Mar. 2, 2007.

This application is a continuation-in-part of U.S. patent application Ser. No. 11/681,662, filed Mar. 2, 2007.

The government may have rights in the present invention.

BACKGROUND

The present invention pertains to recognition systems and particularly to biometric recognition systems; in particular the invention pertains to iris recognition systems.

Related applications may include U.S. patent application Ser. No. 10/979,129, filed Nov. 3, 2004, which is a continuation-in-part of U.S. patent application Ser. No. 10/655,124, filed Sep. 5, 2003; and U.S. patent application Ser. No. 11/382,373, filed May 9, 2006, which are hereby incorporated by reference.

U.S. Provisional Application No. 60/778,770, filed Mar. 3, 2006, is hereby incorporated by reference.

U.S. patent application Ser. No. 11/275,703, filed Jan. 25, 2006, is hereby incorporated by reference.

U.S. Provisional Application No. 60/647,270, filed Jan. 26, 2005, is hereby incorporated by reference.

U.S. patent application Ser. No. 11/043,366, filed Jan. 26, 2005, is hereby incorporated by reference.

U.S. patent application Ser. No. 11/372,854, filed Mar. 10, 2006, is hereby incorporated by reference.

U.S. patent application Ser. No. 11/672,108, filed Feb. 7, 2007, is hereby incorporated by reference.

U.S. patent application Ser. No. 11/675,424, filed Feb. 15, 2007 is hereby incorporated by reference.

U.S. patent application Ser. No. 11/681,614, filed Mar. 2, 2007 is hereby incorporated by reference.

U.S. patent application Ser. No. 11/681,662, filed Mar. 2, 2007 is hereby incorporated by reference.

SUMMARY

The present invention is an indexing system to expedite the process of matching a subject to millions (more or less) of templates within a database.

DESCRIPTION

The present system may relate to biometrics, iris recognition systems, image quality metrics, authentication, access control, monitoring, database retrieval, database query, fast database indexing, fast progressive identification, and security and surveillance systems.

Figure 1A:
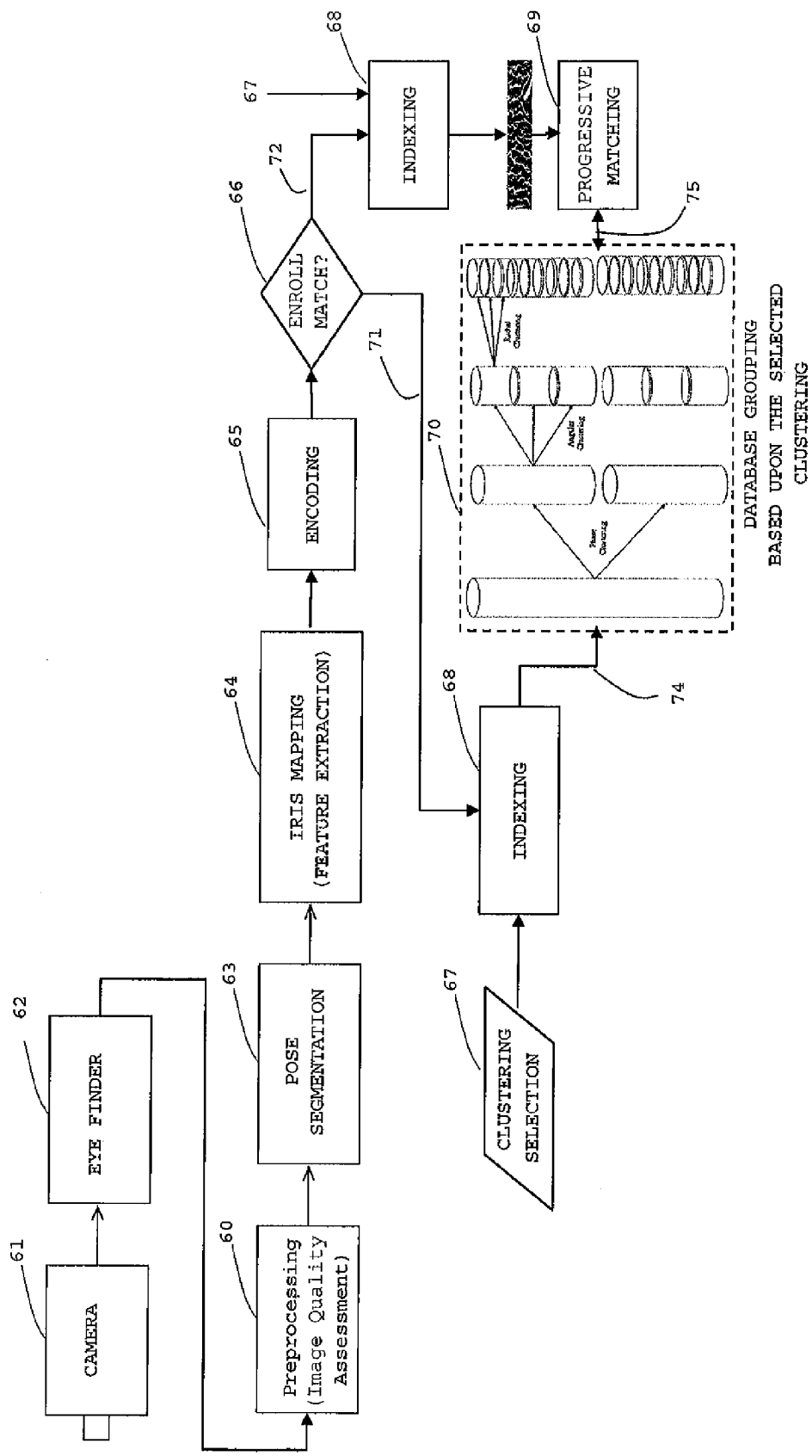
FIG. 1a is a diagram of an overall iris recognition system with database indexing.

The overall eye detection system is shown in FIG. 1a. It shows a camera 61 that may provide an image with a face in it to an eye finder 62 as noted herein. The eyefinder 62 may provide an image of one or two eyes that go to a preprocessing image quality assessment block 60. Output of block 60 may go to an iris segmentation block 63. A polar segmentation (POSE) system in block 63 may be used to perform the segmentation. POSE may be based on the assumption that image (e.g., 320×240 pixels) has a visible pupil where iris can be partially visible. There may be pupil segmentation at the inner border between the iris and pupil and segmentation at the outer border between the iris and the sclera and iris and eyelids. An output having a segmented image may go to a block 64 for mapping/normalization and feature extraction. An output from block 64 may go to an encoding block 65 which may provide an output, such as a barcode of the images put in terms of ones and zeros. An output of the encoding block 65 may go to an indexing block 68 through the choice of enrolling or matching of diamond or block 66 to group and cluster the bits for either enrolling or matching process. The choice of enrollment made at block 66, i.e., path 71 as input to indexing block 68 of the barcode may provide a basis for storage in block 70 of the eye information based upon sub-blocks of datasets which may be used for enrolling and indexing, at block 70. The block of bit indexing 68 may be configured based upon the clustering choice of the output of block 67 feeding into block 68. The indexing block of the query barcode once triggered by the matching option, i.e., through path 72 as input from block 66 will output the probe barcode to progressive matching of block 69. The progressive matching of block 69 may match the subclasses of the barcode bits using the configuration of the database grouping. The clustering scheme, once selected at block 67 as input to block 68, should be kept the same for both enrollment and matching for consistency at inputs 74 and 75, respectively.

According to related practices, an information content based retrieval approach while clustering analysis may be conducted on bit codes and not on raw iris images. Further retrieval of an iris template from the database when a query iris is given by processing the raw iris image may be a time consuming task. In this invention, one may present a rapid approach to analyze progressively the bit codes to match against a very large datasets. Furthermore, the iris code may be additionally compressed to fewer bits than previously done before extracting the feature vector for indexing. One may selectively use discriminating information in the iris code as a query to compute the feature vectors for the indexing and querying. This may be regarded as a multi-level of clustering to yield a progressive matching using at least three methods of grouping of bits into subclasses using phase, radial, and angular information and then conducting the matching on only limited subclasses of bits and or using a compact bit format to compute a more compact feature vectors of the barcodes.

The present invention may be an approach and system to classify a given query iris into one of the pre-defined classes. Irises may be retrieved from a large collection of databases using partial information of the iris barcode as a probe and then find the similarity measure for all the features of the iris codes in the database. The information may then be augmented progressively to limited numbers of potential probes of barcode templates in the database. Partial features may be extracted using phase, angular or radial clustering. The resulting bits may be used then for matching or additional cumulative bit analysis on a very compressed version of the resulting iris code bits can be deployed instead. The terms probe and query may be used interchangeably herein.

The bit clustering may involve grouping or classifying of a barcode bits into subsets based upon the phase information, angular location or radial range. This classification of bits into subsets (i.e. subclasses) allows a progressive query and matching starting from fewer bits against all probes in the database (i.e., starting with a single or few classes of bits) and iteratively may include additional classes of bits that would limit the matching process to fewer template queries. When grouping the bits using present clustering methods, it is expected that the number of probes used for matching is inversely dependent on the number of bits being deployed in the matching process. At each step of the progressive matching, only potential matches are kept for next steps of analysis. Hence, the more one progresses in the query by deploying additional bits, the more one eliminates non-potential matchers, leading to fewer templates to match against in next rounds. In other words, the more bits deployed, the less number of templates being used to match against. This may be the main benefit of the present indexing method that is to allow matching the barcode probe against only few of the template queries. In the following, one may present an example to illustrate the progressive matching that reduces the required computational burden of matching large databases.

Figure 1B:
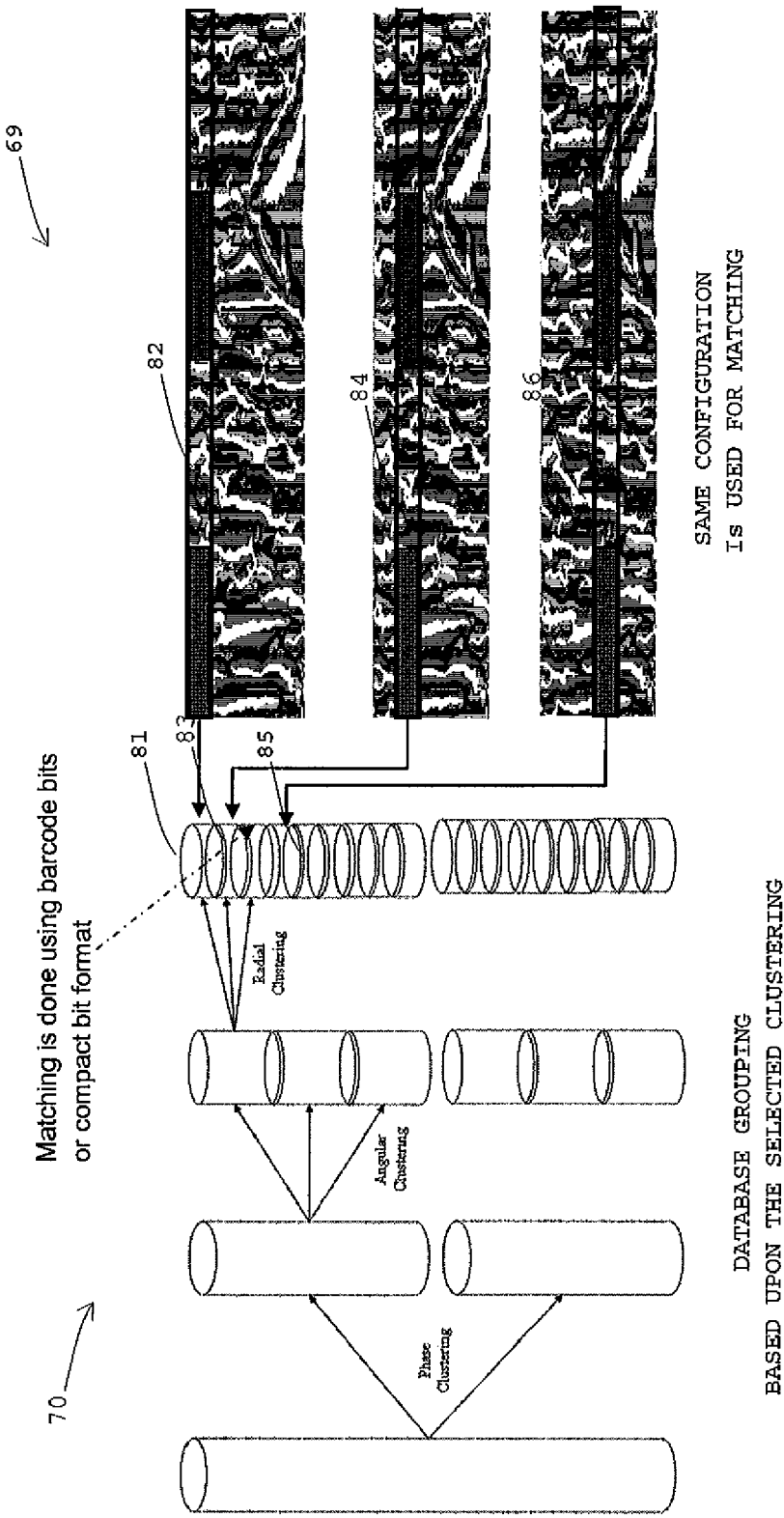
FIG. 1b illustrates the progressive matching process.

Assume that one has 10,000 templates of enrolled barcodes as queries within the database. Each template may have 240 bytes of information in bits. If one conducts a one-to-many matching process, this may require 2.4 mega bytes of bit matches. In the present invention, each barcode may be classified based upon the phase, angular, and radial information. One may assume to have a 2 bit representation of each pixel. Thus, one may cluster the bits of the barcode into two subgroups using the phase clustering. One may cluster further the bits into 5 classes based upon the angular segments, and in addition may cluster the bits into 3 groups of radial ranges. This will result into 3×5×2=30 subclasses of the databases. And each barcode may be subdivided into 30 subsets of bits; each of subset has only 8 bytes. Thus, the configuration of the database in FIG. 1b will result into 30 different datasets stacked within the database as shown at the right hand side of the database grouping. Each dataset may have a class of the bits of all the 10,000 barcode probes. Thus, at the first matching process, one may match only an 8 byte subset (block 82 in FIG. 1b) of the query barcode against only the dataset 81 of FIG. 1b. The dataset 81 represents only partial information of 8 bytes of each of the 10,000 probes. The matching process of 81 may result into 1000 good potential matches out of the 10,000 probes. At the second step of the progressive matching, one may use only these 100 good matches for analysis. One may match another subset of the barcode of size 8 bytes (block 84 in FIG. 1b) against only the corresponding database 83 and limit the matching to only those 1000 probes. One may note that each dataset like 83 has representation of all 10,000 probes. This may result, for example, into 100 good matches. In step 3, one may select a third 8 byte class of the barcode to match against the resulting 100 probes of dataset 85. One may obtain, for example, 10 good matches out of the 100 probes. One might choose at a certain stage to quit the progressive match given that the numbers of potential probes has been limited to only few probes. One may thus process the rest of the barcode subsections against these 10 probes. The overall required matching operations for this example are (10,000× 8+1000×8+100×8+10×240) bytes which is about 0.091 Mega bytes of matching operations, compared to raw matching of 2.4 Meg bytes of operations (that is only 3.8% of computation required in the progressive matching than the regular matching.)

The choice of how one executes bits' grouping into separate subclasses is very crucial to the success of this indexing mechanism. Three methods of bit clustering (phase, angular, and radial) may be used to group the bits into different subclasses. At each clustering stage, one might group bits based upon the types of information and how it pertains to the iris texture representation. For instance, during the progressive matching, one may have to start with the key discriminant bit subclasses at early stage using classes with bits presenting the most significant iris texture information, and end at the least significant classes for last rounds.

The most significant classes are those bits associated with key features of the iris textures. In particular, at the radial axis, one has affirmed that most information of the iris textures is likely to be at the vicinity of the inner border of the iris. At the angular axis, one may realize that the bits representing the pixels of the sclera/iris segment are more reliable than the bits representing the eyelid/iris segments due to high noise-to-signal ratio at the eyelid angular ranges.

An unsupervised iris classification approach may automatically cluster iris codes into a set of prototype classes where the number of desired categories is merely specified a priori. The present iris classification may be based on the most discriminating information content present in an iris pattern and deal with classifying all bits in an iris barcode into one of several classes or themes. To retrieve irises from a large collection of databases, a selective subsection of iris code may be used as a query and one may compute a compact form of the this selective subsection of iris code represented by two feature vectors for the query iris.

Organization of feature data to group the bits of an iris code may be completed in a hierarchical form to compare one subset of bits at a time starting at the extracted feature elements that are closest to the inner iris boundary (row cumulative analysis). If the cumulative feature vector is conducted on the columns, the features that correspond to the middle sclera may be treated first. A simple tree classifier using hamming distance or any other information measure may be utilized as a measure to find similarity for all the features of the irises in the database. The feature vector may be computed using a four stage clustering process to compress the iris barcode to tens of feature elements (i.e., fewer bits of information) used in the class bits.

Figure 2:
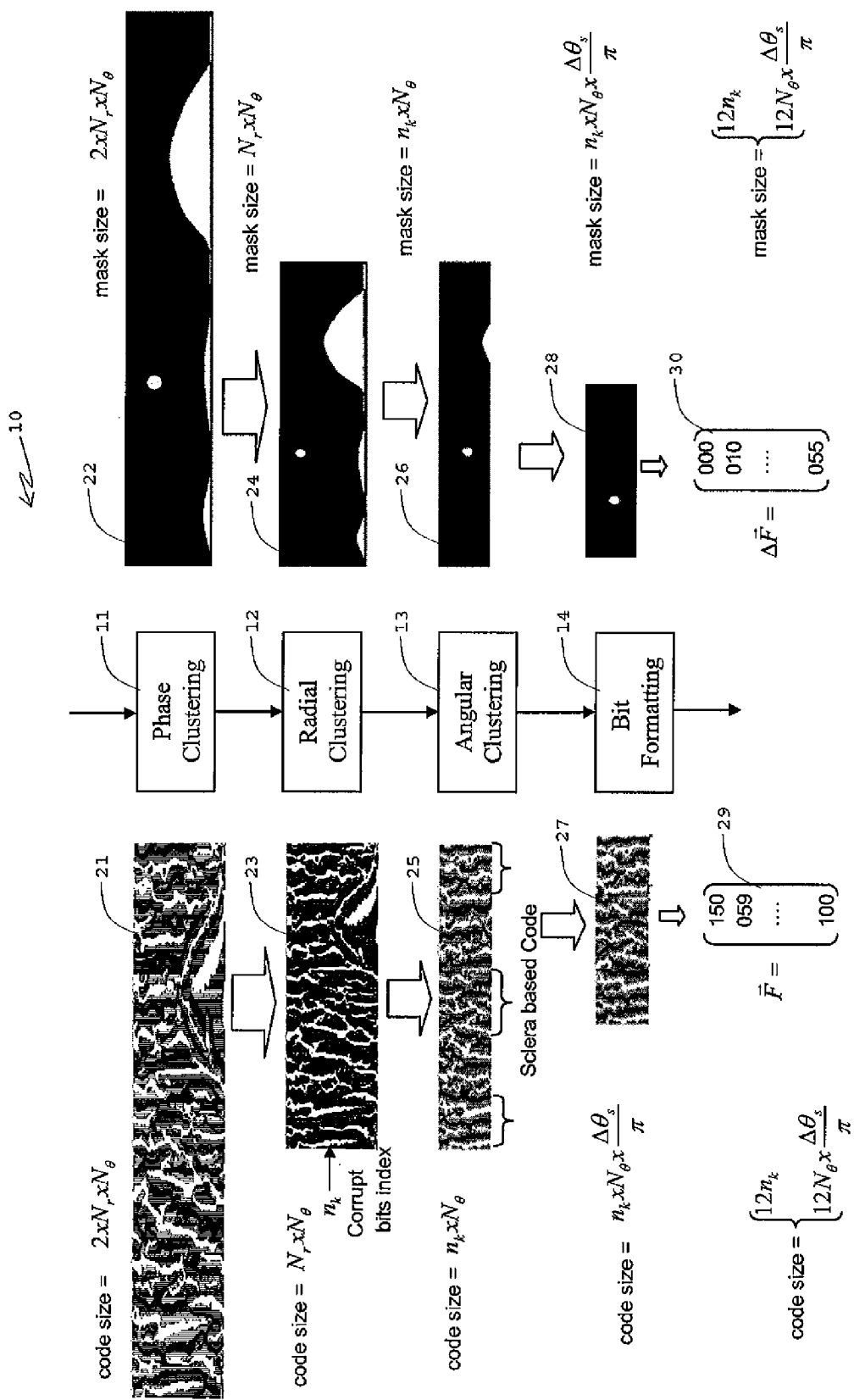
FIG. 2 shows an overall four stage grouping approach of barcode bits to compute a more compact feature vector per each class.

The present system and approach may provide a fast search and indexing of irises based on four stage selective clustering procedure as shown in FIG. 2. The four stages may include phase clustering, radial clustering, angular clustering and bit clustering. The approach may extract the most valuable discriminant information in the iris at each stage based upon different criteria and then cluster the dataset based upon the extracted significant features of the compressed iris bits. The matching may be executed on a subset of barcode bits or a compact feature vector of 12 bit elements representing the subset of compressed bits. One may deploy an unsupervised tree classifier using a Euclidian distance or binning approach as a measure to find similarity between classes and iris query within sub datasets to break down the datasets into smaller sets.

The present multiple-stage clustering approach and system may begin with a phase clustering stage 11 where the initial size of a code 21 and mask 22 may be $2 \times N_r \times N_\theta$. The phase clustering 11 may reduce the size of code 21 and mask 22 down to a size of $N_r \times N_\theta$, as shown by code 23 and mask 24. A corrupt bits index may be indicated by $n_k$. The stage, radial clustering 12, may reduce code 23 and mask 24 to a size of code 25 and mask 26, which is $n_k \times N_\theta$. Code 25 may be sclera based. An angular clustering stage 13 may reduce code 25 and mask 26 down to a size of $n_k \times N_\theta \times \Delta\theta_s/\pi$, as shown by code 27 and mask 28. In turn, a bit clustering stage 14 may reduce the code 27 and mask 28 size down to a code 29 and mask 30 having a size equal $12 n_k$ (if summation of bits is conducted on the horizontal axis) or $12 N_\theta \times \Delta\theta_s/\pi$ if summation is done on the vertical axis.

Figure 3:
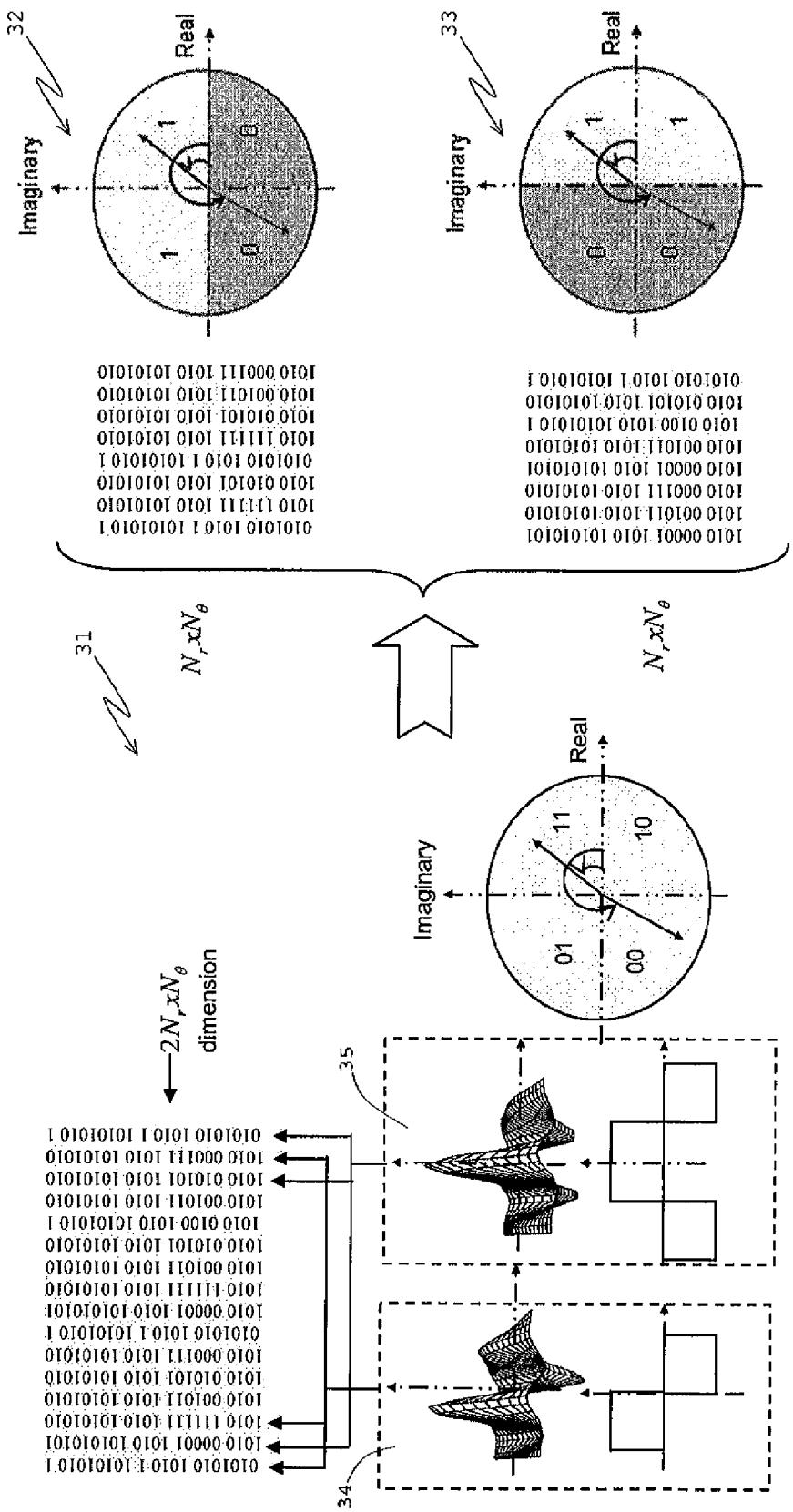
FIG. 3 is a diagram showing phase based clustering.

FIG. 3 is a diagram of phased based clustering 12. In order to encode iris pattern data, decomposition of an iris feature vector 31 having the size $2N_r \times N_\theta$ may be accomplished by using a quadratic pair of filters 34 and 35, with real part specified by an even symmetric filter 34 and the imaginary part specified by an odd symmetric filter 35. Both outputs of the filters may be uncorrelated and be treated separately. Thus, a decomposition may occur into parts 32 and 33 each having the size $N_r \times N_\theta$.

Figure 4:
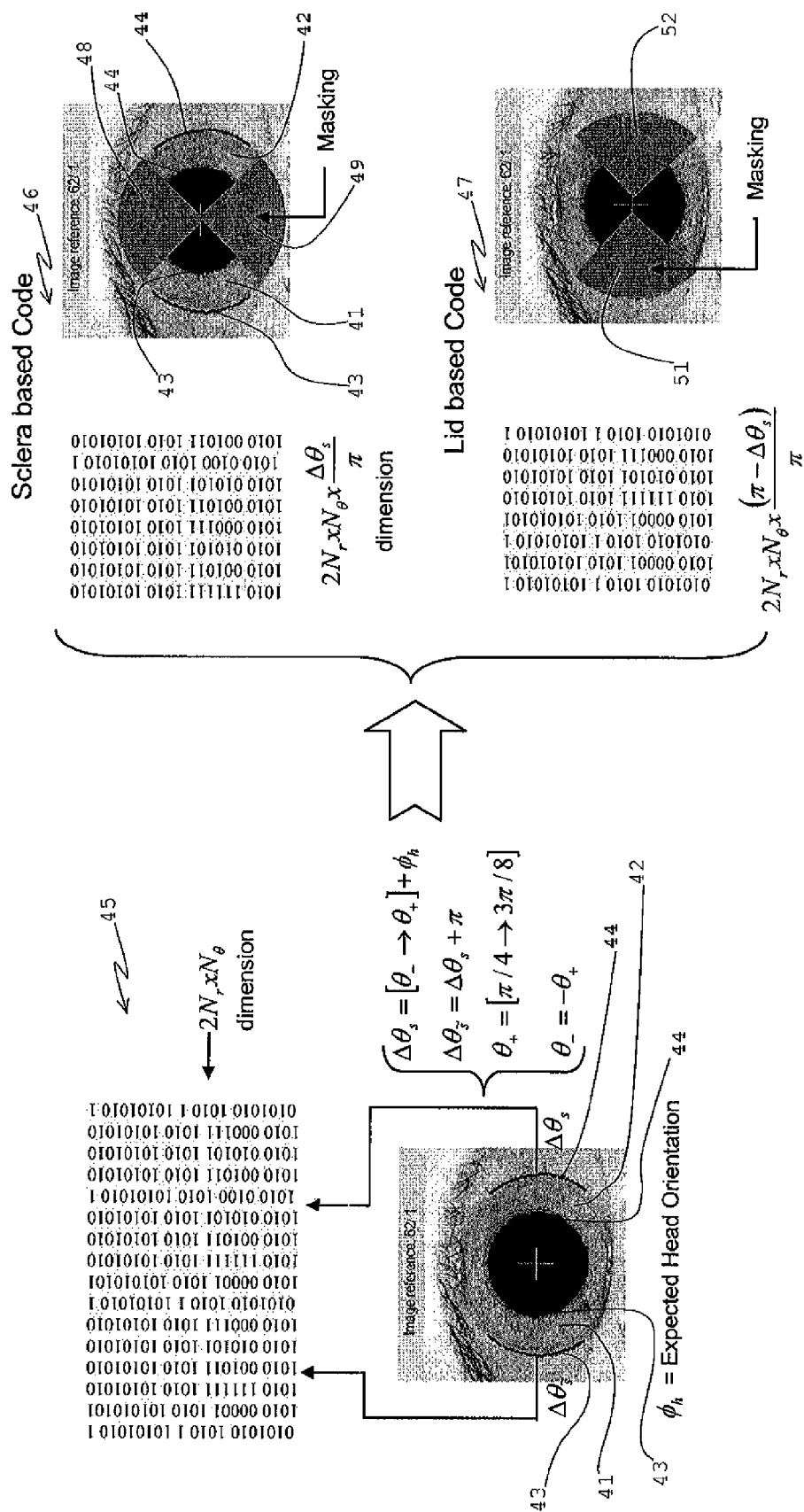
FIG. 4 is a diagram showing angular based clustering.

FIG. 4 is a diagram of angular based clustering. The encoding process may produce a bitwise template containing a number of bits of information covering both the regions bordering the sclera and other adjacent iris segments to top and bottom eyelids. A corresponding noise mask which corresponds to corrupt areas within the iris pattern may be constructed to exclude these noisy bits. Because of the nature of eyelid and eyelash obscurations, most of the corrupt regions may be at the vicinity of the eyelids apart from the sclera central boundaries. Thus, the bits corresponding to the central sclera boundaries may present a more accurate presentation of the actual iris patterns. This stage shows a decomposition of the iris code based upon the boundary limits of the central sclera as shown in FIG. 4.

The sclera portions 41 and 42 of the iris are indicated by boundaries 43 and 44 having sector angles $\Delta\theta_s$ and $\Delta\theta_s$, respectively. The code 45 may have a dimension $2N \times N_\theta$. It may be noted that, $$\Delta\theta_s = [\theta_- \rightarrow \theta_+] + \phi_h,$$

$$\Delta\bar{\theta}_s = \Delta\theta_s + \pi,$$

$$\theta_+ = [\pi/4 \rightarrow 3\pi/8], \text{ and}$$

$$\theta_- = \theta_+,$$

where $\phi_h$ is the expected head orientation. The decomposition of the iris code 45 based on the boundary 43 and 44 limits may lead to a sclera based code 46 and a lid based code 47. The lid portions may have masking 48 and 49 for the sclera based code 46. The sclera portions may have masking 51 and 52 for the lid based code 47. The dimension of the sclera based code may be $$2N_r \times N_\theta \times \Delta\theta_s/\pi.$$

The dimension of the lid based code may be $$2N_r \times N_\theta \times (\pi - \Delta\theta_s)/\pi.$$

Figure 5:
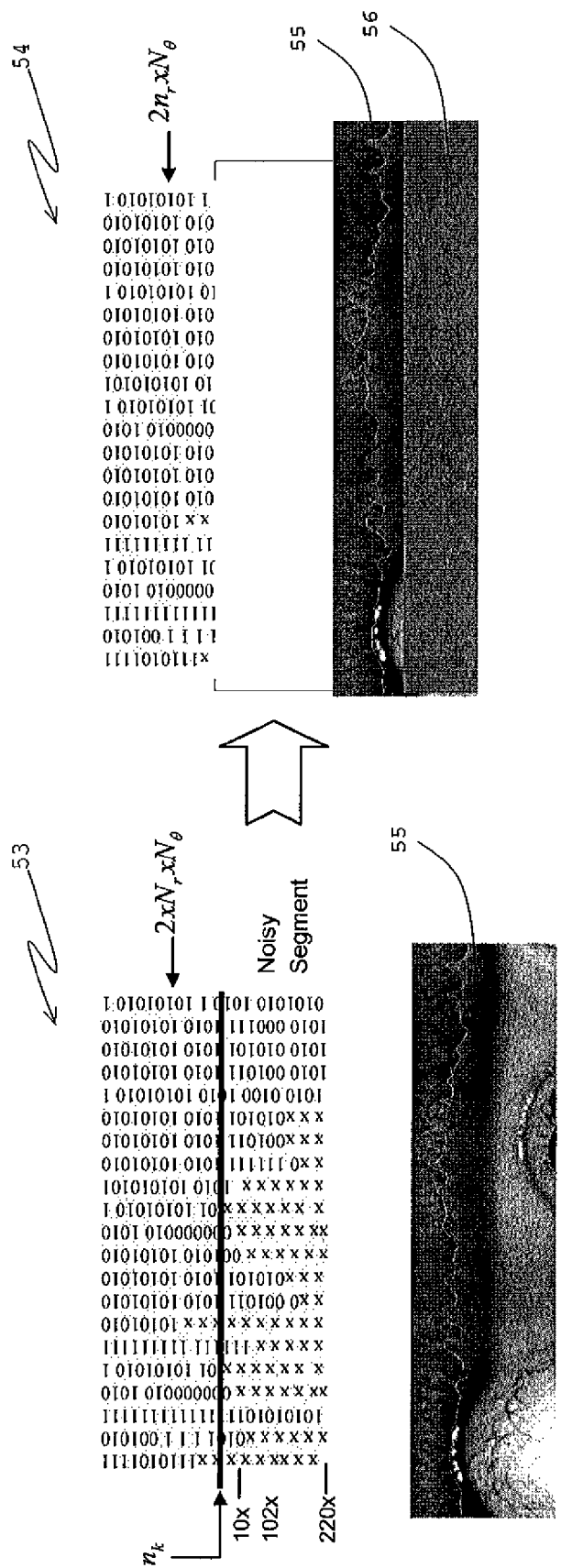
FIG. 5 is a diagram showing radial clustering.

FIG. 5 is a diagram of radial based clustering. Many of the iris patterns may reside at the inner boundaries of the iris as shown in the iris map 55 of the Figure, with the exception of a few samples where the iris pattern is spread consistently over the entire iris region. Even with these few exceptions, it is expected that the outer boundary of the iris will include most of the corrupt iris pixels due to obscuration of eyelids and eyelashes which eventually will be masked out of the analysis. A decomposition of the iris code 53, having a size of $N_r \times N_\theta$, may be effected based upon a radial segment that has the least number of corrupt bits. To control the number of corrupt bits, one may replace the original mask (of size $N_r \times N_\theta$ bits) with a partial of the range, example the first single byte (8 bits) only to indicate the index of the least radius $n_r$, which has the minimum number of corrupt bits (sum of x bits in horizontal direction that does not exceed a predefined fraction (e.g., 5 percent) of the angular resolution). The corrupt bits index may be indicated by $n_k$. Mask 56 is revealed on map 55. With the masked bits removed, one may have a code 54 having a size of $2n_r \times N_\theta$. The number of rows used in the comparison may be defined based on the minimum value of the index of corrupt bits in both the template and the code to be compared. One may note that $n_r = \min(n_k, n_{Template})$.

Figure 6:
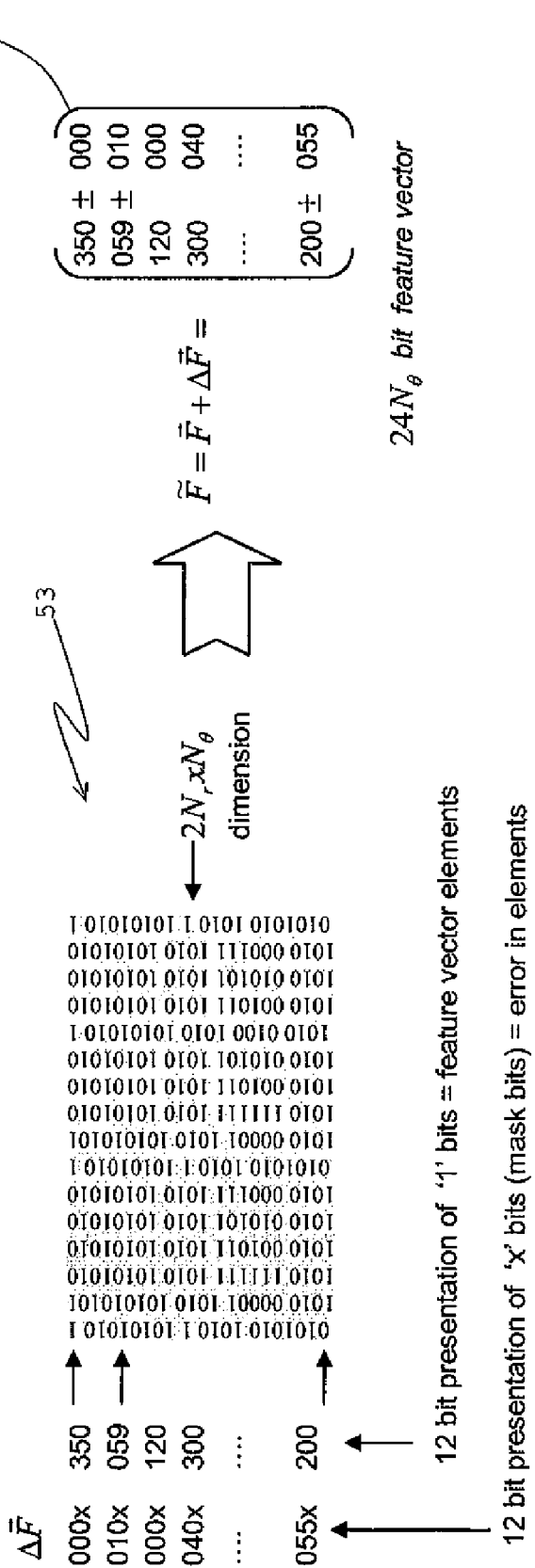
FIG. 6 is a diagram showing bit formatting.

FIG. 6 is a diagram of a compact bit format. An iris code 57 may be noted with a size $2N_r \times N_\theta$. The bit-to-bit comparison of bar codes may be replaced by a comparison of two 12 bit vectors that represent the iris map. The feature vector $\vec{F}$ may be computed by summing the row bit values. The first column left of code 57, with heading $\Delta \vec{F}$, may be a 12 bit presentation of "x" bits (mask bits)=error in elements. The column, adjacent to the first column, may be a 12 bit presentation of "1" bits=feature vector elements. One may track the number of corrupt bits by the 12 bit vector $\Delta \vec{F}$ to account for the error margin during a comparison of feature vectors. One may chose to sum over the angular values so that the comparison will not be affected by any head orientation. A similar approach may be applied to sum through columns rather than rows or both simultaneously.

One may have $\tilde{F} = \vec{F} + \Delta \vec{F} \cdot \tilde{F}$, the resultant $24 N_\theta$ bit feature vector 58, is shown in the Figure. The present approach may expedite the process by at least the number of shifts times over the related art techniques given that summation over the angular range does not require shifting for actual matching. Summing over the radial may still dictate the use of shifting of these feature vectors to account for head orientation changes.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A method of indexing and searching a database comprising:

providing a storage module;

providing a comparator module communicatively coupled to the storage module;

providing a database of iris templates within the storage module, wherein each iris template in the database comprises a barcode configured to have a certain number of bits;

hierarchically partitioning the database into a plurality of layers of sub-databases of the iris templates based on phase information, radial information, and/or angular information of an iris image, wherein each iris template in each of the layers of the sub-databases comprises a segment of the iris template barcode and the sum of the iris templates of each layer of sub-databases represents all the iris templates in the database;

providing a barcode of an iris image for matching to an iris template in the database, wherein the barcode of the iris image has the same configuration as the configuration of each iris template in the database;

selecting a segment of the barcode of the iris image that corresponds to a segment of an iris template in a layer of the sub-databases; and progressively matching the selected segment of the barcode of the iris image to an iris template in a layer of the sub-databases by progressing from a top layer of the sub-databases to a lower layer of the sub-databases; and wherein the layers of the sub-databases comprise:
phase clustering;
radial clustering;
angular clustering; and
bit clustering or binning.

2. The method of claim 1, wherein the segment of the iris template barcode includes only a combination or transformation of a portion of the bits in a barcode.

3. The method of claim 1, wherein hierarchically partitioning the database into a plurality of sub-databases of templates based on phase information, radial information, and/or angular information includes two or more types of information.

4. The method of claim 3, wherein the two or more types of information is progressive relative to the number of layers of the sub-databases in the plurality of sub-databases and a segment of each iris template in the sub-database and the segment is a number of bits representing an iris template of the sub-database.

5. The method of claim 4, wherein a first layer of the sub-databases of the database has iris templates represented by an iris template including a larger number of bits than a second layer of the sub-databases.

6. The method of claim 5, wherein a number of iris templates in the first layer of the sub-databases is the same as or larger than a number of iris templates in the second layer of the sub-databases.

7. The method of claim 1, wherein a number of iris templates used for matching is reduced when progressing from one layer of the sub-databases to another layer of the sub-databases.

8. The method of claim 6, wherein a matching of an iris image barcode is reduced to a least number of iris templates.

9. The method of claim 8, wherein bit summation or combination or transformation of bits on a barcode is used to compress the barcode.

10. The method of claim 9, wherein bit summation or transformation on a barcode bits is used to increase a speed of matching an iris image barcode to an iris template in the database.

11. The method of claim 8, wherein bit summation on a horizontal or vertical axis on the barcode is used to increase a speed of matching the barcode to an iris template in the database.

12. The method of claim 1, wherein the radial information to start is based on information close to an inner border of an iris closest to the pupil borders.

13. The method of claim 1, wherein the angular information is based on angular segments and sclera-iris angular segments away from the eyelids are considered for matching before other segments.

14. A method for matching an iris image barcode to a database comprising:
providing a barcode of an iris image;
providing a storage module;
providing a comparator module communicatively coupled to the storage module;
providing a database comprising a certain number of iris templates within the storage module, the iris templates configured to have a certain number of bits;
hierarchically partitioning the database into multiple layers of datasets based on phase information, radial information, and/or angular information, the number of iris templates in each dataset are equal to or smaller than the number of iris templates in the database and the certain number of templates in each dataset configured to have a segment of the iris template as a certain number of bits equal to or smaller than the certain number of bits of the iris templates in the database;
matching a segment of the barcode of an iris image to a corresponding segment of an iris template stored in the database by progressively matching the certain number of bits of the iris image barcode to the corresponding certain number of bits of the iris templates in the dataset progressing from one layer of the dataset to another layer of the dataset.

15. The method of claim 14 wherein:
the matching of the segment of the barcode of an iris image to an iris template of the dataset results in a number of iris templates which are a possible match for the barcode of an iris image; and
the number of iris templates which are a possible match for the barcode of an iris image is less than the number of iris templates in the database.

16. A method for searching a database comprising:
providing a storage module;
providing a comparator module communicatively coupled to the storage module;
providing a database comprising iris templates within the storage module, the iris templates configured to include information as a certain number of bits;
providing an iris image barcode configured to include information as a certain number of bits corresponding to the certain number of bits of the iris templates in the database;
partitioning the database into a number of sub-databases based on phase information, the number of sub-databases comprising a number of iris templates, the number of iris templates configured to include information as a segment of the iris template having a certain number of bits;
partitioning the sub-databases into a number of datasets based on angular information, the number of datasets comprising a number of iris templates, the number of iris templates configured to include information as a segment of the iris template having a certain number of bits;
partitioning the datasets into a number of sub-datasets based on radial information, the number of sub-datasets comprising a number of iris templates, the number of iris templates configured to include information as a segment of the iris template having a certain number of bits; and matching a segment of the iris barcode to a corresponding segment of an iris template in the database by progressively matching the certain number of bits of the iris image barcode to the corresponding certain number of bits of the iris templates progressing from the sub-databases to the datasets, and to the sub-datasets;

wherein:

the sum of the iris templates in all of the sub-databases represents all the iris templates in the database;

the sum of the iris templates in all of the datasets represents all the iris templates in the database;

the sum of the iris templates in all of the sub-datasets represents all the iris templates in the database;

the certain number of bits of the iris templates in the database is greater than the certain number of bits of the iris templates in the sub-databases;

the certain number of bits of the iris templates in the sub-databases is greater than the certain number of bits of the iris templates in the datasets;

the certain number of bits of the iris templates in the datasets is greater than the certain number of bits of the iris templates in the sub-datasets;

the matching of the segment of the iris image barcode to a corresponding segment of an iris templates of the sub-dataset results in a number of iris templates which are a possible match for the iris image barcode; and the number of iris templates which are a possible match is less than the certain number of iris templates in the sub-dataset.

17. The method of claim 16, wherein a progression of templates and datasets continues until a dataset exists for all types of available information.

* * * * *